United States Patent
Marando et al.

(10) Patent No.: US 6,933,697 B2
(45) Date of Patent: Aug. 23, 2005

(54) PARABOLIC CONTROL OF THE DUTY CYCLE OF A PULSE WIDTH MODULATED SIGNAL

(75) Inventors: Eileen M. Marando, Bellmore, NY (US); Robert W. Schoepflin, Port Jefferson, NY (US)

(73) Assignee: Standard Microsystems Corporation, Hauppauge, NY (US)

(*) Notice: Subject to any disclaimer, the term of this patent is extended or adjusted under 35 U.S.C. 154(b) by 102 days.

(21) Appl. No.: 10/440,606

(22) Filed: May 19, 2003

(65) Prior Publication Data

US 2004/0232869 A1 Nov. 25, 2004

(51) Int. Cl.[7] .......................... G05B 11/28; G05D 23/00
(52) U.S. Cl. ...................................... 318/599; 318/471
(58) Field of Search ................................. 318/599, 634, 318/471–473, 811; 388/804, 811, 819, 829, 831, 934; 361/24, 25

(56) References Cited

U.S. PATENT DOCUMENTS

| | | | | |
|---|---|---|---|---|
| 4,476,423 A | * | 10/1984 | Mallick et al. | 318/800 |
| 4,486,149 A | * | 12/1984 | Merkel | 417/32 |
| 4,513,232 A | * | 4/1985 | Safiuddin | 318/561 |
| 4,629,035 A | * | 12/1986 | Tanahashi et al. | 187/296 |
| 4,722,669 A | | 2/1988 | Kundert | |
| 4,763,347 A | * | 8/1988 | Erdman | 318/254 |
| 4,771,845 A | * | 9/1988 | Shimizu | 180/446 |
| 4,882,586 A | * | 11/1989 | Dolph et al. | 341/169 |
| 5,307,439 A | | 4/1994 | Enami | |
| 5,363,024 A | * | 11/1994 | Hiratsuka et al. | 318/254 |
| 5,727,928 A | | 3/1998 | Brown | |
| 5,825,972 A | | 10/1998 | Brown | |
| 5,929,591 A | * | 7/1999 | Katou et al. | 318/723 |
| 5,942,866 A | | 8/1999 | Hsieh | |
| 6,037,732 A | * | 3/2000 | Alfano et al. | 318/471 |
| 6,140,786 A | * | 10/2000 | Lee | 318/471 |
| 6,188,189 B1 | * | 2/2001 | Blake | 318/471 |
| 6,208,538 B1 | | 3/2001 | Halamik et al. | |
| 6,226,324 B1 | | 5/2001 | Allstrom | |
| 6,324,858 B1 | * | 12/2001 | Holden | 62/211 |
| 6,519,167 B1 | | 2/2003 | Nguyen | |
| 6,528,987 B1 | | 3/2003 | Blake et al. | |
| 6,661,679 B1 | | 12/2003 | Yang et al. | |
| 2002/0140389 A1 | * | 10/2002 | Ohki et al. | 318/471 |
| 2003/0111976 A1 | * | 6/2003 | Kumar | 318/783 |

FOREIGN PATENT DOCUMENTS

JP          05049298 A    *   2/1993    ............. H02P/7/63

OTHER PUBLICATIONS

Analog Devices, Publication ADM1027, "dBCOOL™ Remote Thermal Controller and Voltage Monitor," 2003, 56 pages.

National Semiconductor Corporation, Publication LM63, "±1° C Accurate Remote Diode Digital Temperature Sensor with Integrated Fan Control," Feb. 2003, 28 pages.

Stephen Ohr, "Analog IC vendors find 'Intel Inside' a safe bet," Sep. 12, 2002, online at http://www.eetimes.com/story/OEG20020912S0026.

* cited by examiner

*Primary Examiner*—David Martin
*Assistant Examiner*—Patrick Miller
(74) *Attorney, Agent, or Firm*—Meyertons Hood Kivlin Kowert & Goetzel, P.C.; Jeffrey C. Hood

(57) ABSTRACT

A system may include control logic and a PWM generator configured to generate a PWM (Pulse Width Modulated) signal. The PWM generator is configured to generate the duty cycle of the PWM signal dependent on a duty cycle value generated by the control logic. The control logic stores an inverse focal point value and is configured to generate the duty cycle value by processing the inverse focal point value and a temperature value indicating a current temperature according to the equation of a parabola.

13 Claims, 4 Drawing Sheets

FIG. 2B: Desired Parabola

FIG. 2A: Parabola shifted to origin $PWM_{MIN} = 0$     $PWM_{MAX} = 255$     $T_{MIN} = 50$     $T_{MAX} = 60$

| Calculated at Origin | | Focal Point | | Compensated | |
|---|---|---|---|---|---|
| $\Delta$Temp | $\Delta$PWM | p | P = 1/p | Temp | PWM |
| 0 | 0 | 0.095238 | 10.5 | 50 | 0 |
| 1 | 3 | 0.095238 | 10.5 | 51 | 3 |
| 2 | 11 | 0.095238 | 10.5 | 52 | 11 |
| 3 | 24 | 0.095238 | 10.5 | 53 | 24 |
| 4 | 42 | 0.095238 | 10.5 | 54 | 42 |
| 5 | 66 | 0.095238 | 10.5 | 55 | 66 |
| 6 | 95 | 0.095238 | 10.5 | 56 | 95 |
| 7 | 129 | 0.095238 | 10.5 | 57 | 129 |
| 8 | 168 | 0.095238 | 10.5 | 58 | 168 |
| 9 | 213 | 0.095238 | 10.5 | 59 | 213 |
| 10 | 255 | 0.095238 | 10.5 | 60 | 255 |

$PWM_{MIN} = 96$  $PWM_{MAX} = 255$  $T_{MIN} = 50$  $T_{MAX} = 60$

| Calculated at Origin | | Focal Point | | Compensated | |
|---|---|---|---|---|---|
| ΔTemp | ΔPWM | p | P = 1/p | Temp | PWM |
| 0 | 0 | 0.153846 | 6.5 | 50 | 96 |
| 1 | 2 | 0.153846 | 6.5 | 51 | 98 |
| 2 | 7 | 0.153846 | 6.5 | 52 | 103 |
| 3 | 15 | 0.153846 | 6.5 | 53 | 111 |
| 4 | 26 | 0.153846 | 6.5 | 54 | 122 |
| 5 | 41 | 0.153846 | 6.5 | 55 | 137 |
| 6 | 59 | 0.153846 | 6.5 | 56 | 155 |
| 7 | 80 | 0.153846 | 6.5 | 57 | 176 |
| 8 | 104 | 0.153846 | 6.5 | 58 | 200 |
| 9 | 132 | 0.153846 | 6.5 | 59 | 228 |
| 10 | 163 | 0.153846 | 6.5 | 60 | 255 |

PARABOLIC CONTROL OF THE DUTY CYCLE OF A PULSE WIDTH MODULATED SIGNAL

BACKGROUND OF THE INVENTION

1. Field of the Invention

This invention relates to pulse width modulation (PWM) and, more particularly, to controlling the duty cycle of a pulse width modulated signal used to power a fan.

2. Description of the Related Art

Fans are often used to evacuate warm air from enclosures in which electronic systems are contained. For example, most computer systems include at least one fan to aid in system cooling. The increased airflow provided by fans aids in eliminating waste heat that may otherwise build up and adversely affect system operation.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

Fan drive systems often use a PWM generator to drive an external circuit that controls the voltage between the power and ground interfaces of the fan, which in turn controls the speed of the fan. PWMs are useful because they provide a digital control for the pulse width of a signal. The fan is turned on for the duration of the pulse and turned off between pulses. The duty cycle of the pulse train currently being provided to the fan determines the fan's speed.

One problem that results from using PWMs to drive fan circuits is that the fan noise increases when the duty cycle of the PWM is changed. Typically, linear algorithms are used to control how the duty cycle of the PWM changes in response to increases in temperature. Thus, the duty cycle of the PWM will undergo the same amount of change per degree of temperature change, regardless of how the temperature relates to the allowable range of temperatures.

SUMMARY

Various embodiments of a method and apparatus for providing parabolic control of the duty cycle of a pulse width modulator (PWM) are disclosed. In one embodiment, a system may include control logic and a PWM generator configured to generate a PWM signal. The PWM generator is configured to generate the duty cycle of the PWM signal dependent on a duty cycle value generated by the control logic. The control logic stores an inverse focal point value and is configured to generate the duty cycle value by processing the inverse focal point value and a temperature value indicating a current temperature according to the equation of a parabola.

In some embodiments, the control logic may be configured to generate the duty cycle value by processing the temperature value according to an equation of a parabola that passes through the coordinate origin (e.g., duty cycle value=0 and temperature value=0) and shifting a result of the equation into a range of operable duty cycle values. For example, the control logic may be configured to generate the duty cycle value by: generating an uncompensated duty cycle value proportional to a square of a temperature delta value multiplied by the inverse focal point value, where the temperature delta value equals the temperature value minus a minimum temperature value; and generating the duty cycle value by adding a minimum duty cycle value to the uncompensated duty cycle value.

In some embodiments, a method may involve: powering a fan according to a PWM signal; storing an inverse focal point value; processing the inverse focal point value and a temperature value representing a current temperature according to an equation of a parabola to generate a duty cycle value; and generating a duty cycle of the PWM signal dependent on the duty cycle value.

BRIEF DESCRIPTION OF THE DRAWINGS

Other aspects of the invention will become apparent upon reading the following detailed description and upon reference to the accompanying drawings in which.

Figure 1:
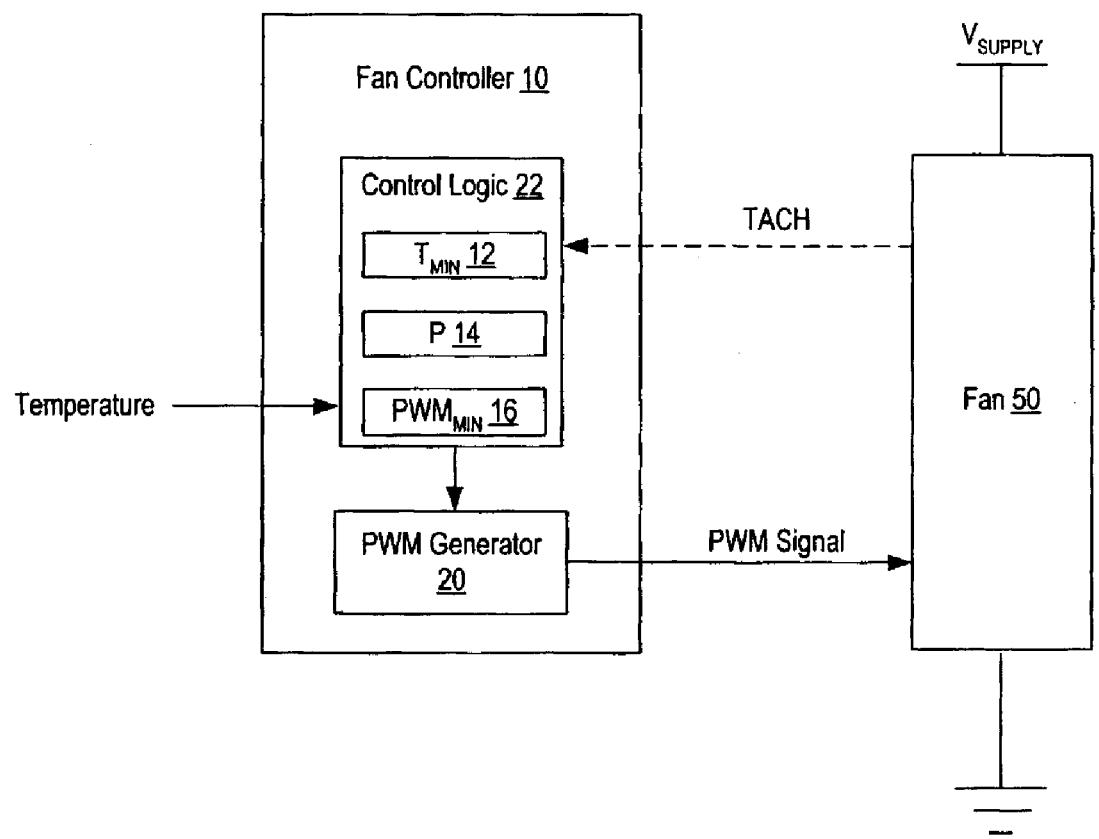
FIG. 1 is a block diagram of a system for controlling a fan, according to one embodiment.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

FIG. 1 shows an embodiment of a system for powering a fan with a PWM (Pulse Width Modulated) signal. This system includes a controller 10 and a fan 50. A PWM signal generated by fan controller 10 controls whether the fan 50 is turned on or not. This system may be included in an enclosure containing various electronic devices. For example, this system may be included in a desktop computer chassis or a storage array enclosure.

The fan controller 10 includes control logic 22 and a PWM (Pulse Width Modulator) generator 20 configured to generate the PWM signal. The control logic 22 is configured to provide a value indicative of the duty cycle to the PWM generator 20, and the PWM generator 20 is configured to responsively generate the PWM having that duty cycle. PWM generator 20 is an example of a means for powering a fan 50 according to a PWM signal having a duty cycle dependent on a duty cycle value, and control logic 22 is an example of a means for generating a duty cycle value according to an equation for a parabola.

The fan 50 may have two ports (power and ground) or three ports (power, ground, and tachometer) in some embodiments. In some embodiments in which the fan 50 has three ports, the fan controller 10 may generate the PWM signal dependent on the fan tachometer signal.

In some embodiments, the PWM signal may be input to fan drive circuitry (not shown) such as a switch. For example, fan drive circuitry may include a switch coupled between the ground input of the fan 50 and ground. When the PWM signal is high, the switch may close, connecting the ground interface of the fan 50 to ground. When the PWM is low, the switch may open, creating an open circuit between the ground interface of the fan 50 and ground. Accordingly, opening the switch by deasserting the PWM signal turns off the power to the fan 50. Note that the PWM signal may be an active high or an active low signal. For example, if the switch is implemented using a PNP transistor, switch may close when the PWM signal is low. In such an embodiment, the switch may be coupled to the power interface of the fan 50 (as opposed to the ground interface) between the power interface and the power source. When the switch is closed, the power interface of the fan 50 is connected to the power source, turning on the fan 50. Note that other embodiments may include different fan drive circuitry or no fan drive circuitry at all (e.g., the PWM signal may be input directly to one of the fan's input terminals).

As the duty cycle (the ratio of the time in which the PWM signal is asserted to the time in which the PWM signal is deasserted) of the PWM signal increases, the fan is powered for a greater percentage of time each cycle. Consequentially, the fan speed increases. Similarly, as the duty cycle decreases, the fan speed decreases. Thus, fan controller 10 may control the speed of the fan 50 by varying the duty cycle of the PWM signal.

Fan controller 10 may receive an indication of the current temperature (e.g., by detecting the current temperature itself or by receiving a digital or analog signal representing the temperature detected by another device) and control the fan speed dependent on the current temperature. As the temperature increases, the fan controller 10 may increase the fan speed in order to provide increased cooling. If the temperature decreases, the fan controller 10 may decrease the fan speed. If the temperature stabilizes, the fan controller 10 may keep the fan speed the same. Note that in many embodiments, the fan controller 10 may vary the duty cycle of the PWM signal according to other parameters in addition to the current temperature. For example, in some embodiments, the fan controller 10 may detect both the current temperature and the rate of temperature change experienced in the most recent period. In such embodiments, the fan controller may be configured to selectively vary the duty cycle of the PWM signal less at higher values of the temperature if the temperature is stabilizing than if the temperature is increasing. Other parameters may also affect how the fan controller 10 modifies the duty cycle of the PWM signal.

The fan controller 10 may be configured to generate the PWM signal such that a duty cycle of the PWM signal has a parabolic relationship to temperature. By causing the duty cycle to vary parabolically with temperature, the amount of change in duty cycle per degree change in temperature may vary depending on how much the current temperature deviates from a minimum and/or maximum temperature. Fan controller 10 may vary the duty cycle of the PWM more per degree of temperature at higher temperatures than at lower temperatures. For example, assuming a minimum temperature of 50 degrees Celsius, the fan controller 10 may vary die duty cycle less per degree if the temperature changes to 52 degrees Celsius (two degrees above the minimum) than if the temperature changes to 56 degrees Celsius (six degrees above the minimum). Stated another way, by causing the duty cycle to have a parabolic relationship with temperature, the fan controller 10 may effectively weigh the effect a constant (e.g., one degree) change in temperature has on the PWM duty cycle based on the current temperature's relationship to the minimum and/or maximum allowable temperatures in the system. Thus, when the temperature is hovering at a temperature around the minimum temperature, slight changes in temperature may have relatively little effect on the PWM signal's duty cycle. In contrast, at temperatures near a maximum temperature, the PWM signal's duty cycle may change at a much greater rate in response to slight changes in temperature.

In many embodiments, less acoustic noise may be generated for smaller changes in fan speed than for larger changes in fan speed. Accordingly, by controlling the duty cycle to have a parabolic relationship with temperature, the amount of change in fan speed may be reduced at lower temperatures, causing a reduction in the amount of acoustic noise at lower temperatures relative to the amount of acoustic noise generated at higher temperatures.

The control logic 22 may include registers 12–16 that store values used to calculate the appropriate duty cycle of the PWM signal. In some embodiments, the registers may store a minimum temperature $T_{MIN}$, a minimum PWM duty cycle value $PWM_{MIN}$, and focal point p (or, as shown in FIG. 1, an inverse focal point P that is proportional to 1/p). The minimum temperature $T_{MIN}$ is the temperature at which the fan controller 10 is configured to turn on the fan 50. The mimimum PWM duty cycle value $PWM_{MIN}$ is the value of PWM that will turn on the fan at a desired minimum speed. The focal point value determines the shape of the curve representing the relationship between duty cycle and temperature. In some embodiments, one or more of these values may be programmable, allowing a user to adjust the orientation and/or shape of the curve representing the relationship between duty cycle and temperature.

Figure 2:
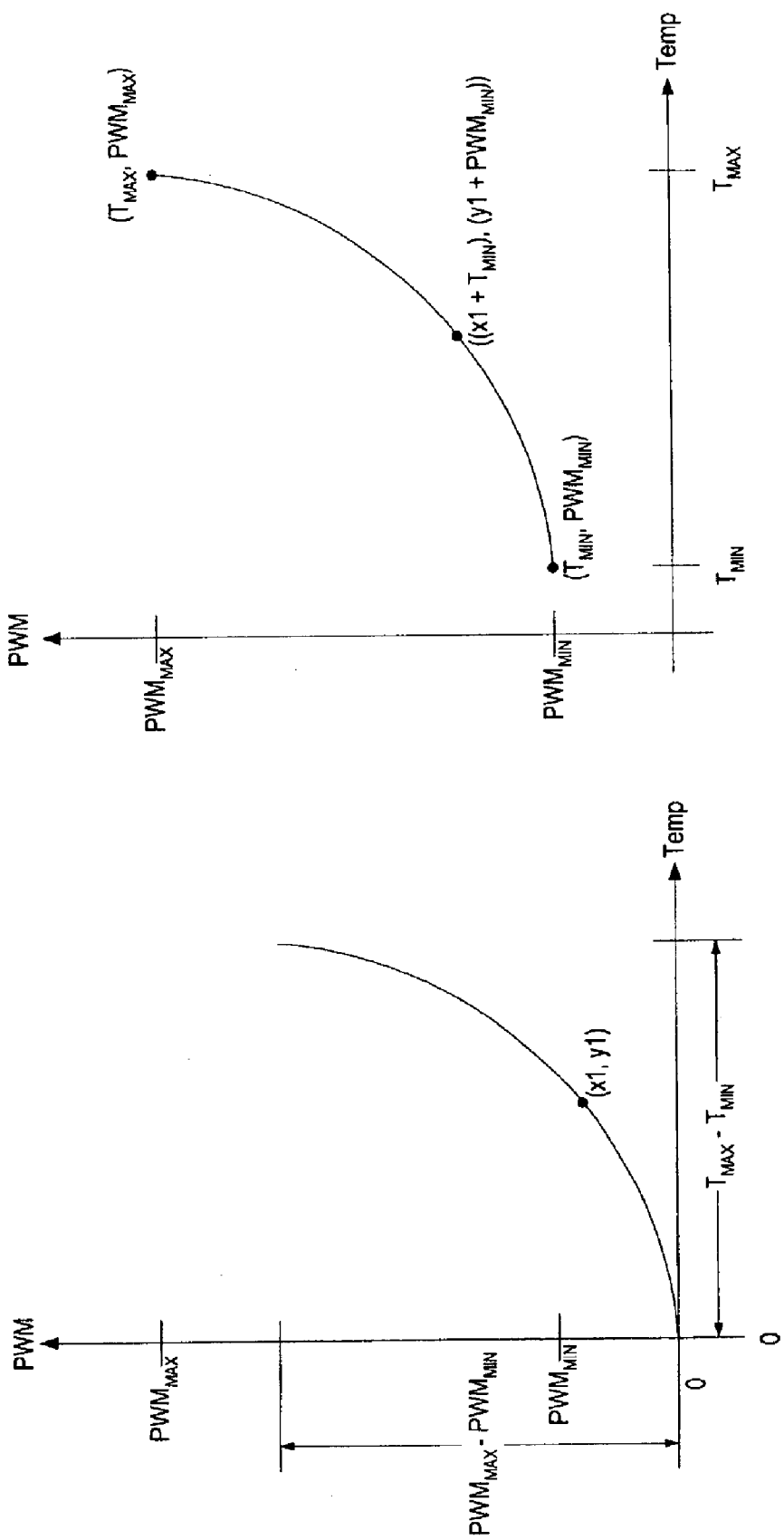
FIGS. 2A–2B show the parabolic relationship between a current temperature and a PWM value generated by a fan controller, according to one embodiment.

FIGS. 2A–2B illustrate a PWM verses temperature parabolic curve that may be implemented by control logic 22 in one embodiment. The x-axis represents temperature and the y-axis represents duty cycle values. In the illustrated embodiments, the duty cycle is controlled by an eight-bit duty cycle value, which ranges from 0 (0% duty cycle) to 255 (100% duty cycle). The percentage duty cycle may equal the duty cycle value multiplied by 0.39 (e.g., a 50% duty cycle=128*0.39). Note that other embodiments may implement N-bit duty cycle values, where N has a value other than eight.

The control logic 22 may calculate an appropriate duty cycle value to control the duty cycle of the PWM signal using a parabolic equation that represents a parabola that passes through the origin, as shown in FIG. 2A. The control logic 22 may then modify the duty cycle value in order to generate the appropriate point on a parabola that does not intersect the origin, as shown in FIG. 2B. The parabola shown in FIG. 2B represents the parabola of FIG. 2A shifted into a desired region of operation. Alternatively, the control logic 22 may directly calculate the duty cycle value according to desired parabola using the general equation for a parabola. However, embodiments that implement the equation of a parabola at the origin ($x^2=4py$) may include less complex hardware than embodiments that implement the general equation of a parabola ($(x-h)^2=4p(Y-k)$) to calculate the duty cycle.

Several variables may be used to generate the duty cycle value from the temperature value, including the values $T_{MIN}$, $PWM_{MIN}$, and P mentioned above. $T_{MIN}$, $PWM_{MIN}$, and P may be programmed into the fan controller 10 as 8-bit values in some embodiments. Additional variables that are useful when describing the relationship between the duty cycle and the temperature include $T_{MAX}$, which represents the maximum temperature, and $PWM_{MAX}$, which represents the maximum duty cycle value. The duty cycle value equals $PWM_{MAX}$ when temperature is greater than or equal to $T_{MAX}$. The variable PWM is the calculated PWM duty cycle value, which may range from $PWM_{MIN}$ to $PWM_{MAX}$. Temp equals the measured temperature. In one embodiment, values of Temp may range from −127° C. to +127° C. (note that the fan controller 10 may only respond to a limited range of these values, however). Note that different embodiments may provide different Temp resolutions (e.g., fractional portions of degrees may be represented) and/or ranges.

FIG. 2A, the parabola representing the relationship between temperature and duty cycle is shifted to the origin. The parabola is plotted over a range of temperature values representing the difference between $T_{MIN}$ and $T_{MAX}$ and a range of PWM duty cycle values representing the difference between $PWM_{MIN}$ and $PWM_{MAX}$. An exemplary point on the curve is labeled (x1, y1). The control logic 22 may calculate duty cycle values on this curve proportional to the product of the current temperature value squared and P.

In order to generate points on the parabola shown in FIG. 2A, the control logic 22 may calculate the PWM duty cycle value using the equation of a parabola at the origin by setting the PWM duty cycle value y proportional to $x^2*P$, where $y=PWM-PWM_{MIN}$; $Temp>T_{MIN}$; $x=Temp-T_{MIN}$; and $PWM>PWM_{MIN}$. Temp is the current measured temperature and y is used to compute the desired PWM duty cycle. The control logic 22 may calculate the PWM duty cycle value in hardware or in software. In some embodiments, the control logic 22 may be configured to not lose significant bits throughout the calculation process in order to maintain a desired level of accuracy. Note that the control logic 22 may calculate PWM duty cycle values as a continuous function of temperature (as opposed to determining PWM duty cycle values from a lookup table that implements a step function approximation of a parabola). Thus, the control logic 22 may generate a new duty cycle value for each input temperature value across the entire spectrum of potential input temperature values $T_{MAX}>Temp>T_{MIN}$. Note that this functionality may be somewhat dependent on the precision at which the temperature value and PWM duty cycle value can be represented within the control logic 22.

A user may select an appropriate value of P to program into the control logic 22 using the equation of a parabola at the origin, $p=x^2/4y$, and substituting $x_{MAX}-x_{MIN}$ for x and $y_{MAX}-y_{MIN}$ for y, such that $p=(x_{MAX}-x_{MIN})^2/(4*(y_{MAX}-y_{MIN}))$ P equals 1/p. $x_{MAX}=$ the minimum temperature $T_{MIN}$ and $X_{MAX}=$ the maximum temperature $T_{MAX}$. $y_{MAX}=$ the minimum PWM value $PWM_{MIN}$ and $Y_{MIN}=$ the maximum PWM value $PWM_{MAX}$. If these parameters change (e.g., if the system is modified or moved to a different operating environment), a user may recompute a new value of P and reprogram the fan controller 10 by updating the inverse focal point register 14, $PWM_{MIN}$ register 16, or $T_{MIN}$ register 12.

FIG. 2B shows the curve of FIG. 2A shifted into a desired range of operation. As shown, the parabola has been shifted into the range $T_{MIN}$ to $T_{MAX}$ and $PWM_{MIN}$ to $PWM_{MAX}$. The exemplary point on the curve has been shifted by $T_{MIN}$ in the x direction and $PWM_{MIN}$ in the y direction. The control logic 22 may shift a duty cycle value calculated on the curve shown in FIG. 2A to the curve of FIG. 2B by adding $PWM_{MIN}$ to the duty cycle value calculated using the equation of the parabola at the origin.

Figure 3:
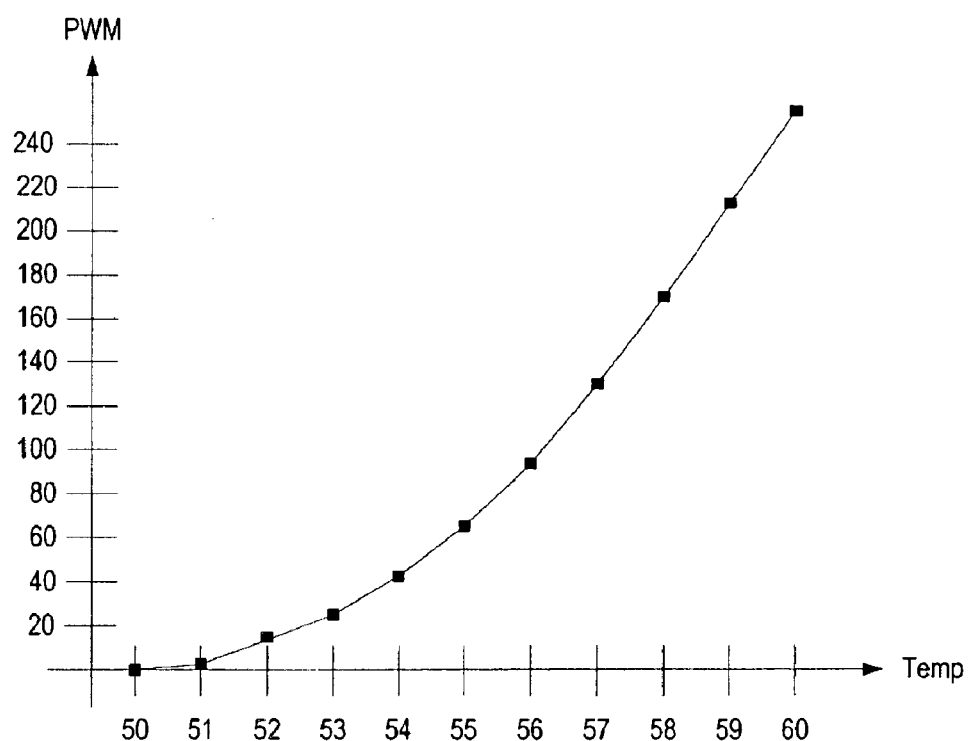
FIG. 3 shows exemplary PWM duty cycle values and a plot of the relationship between the exemplary PWM duty cycle values and temperature, according to one embodiment.
Figure 4:
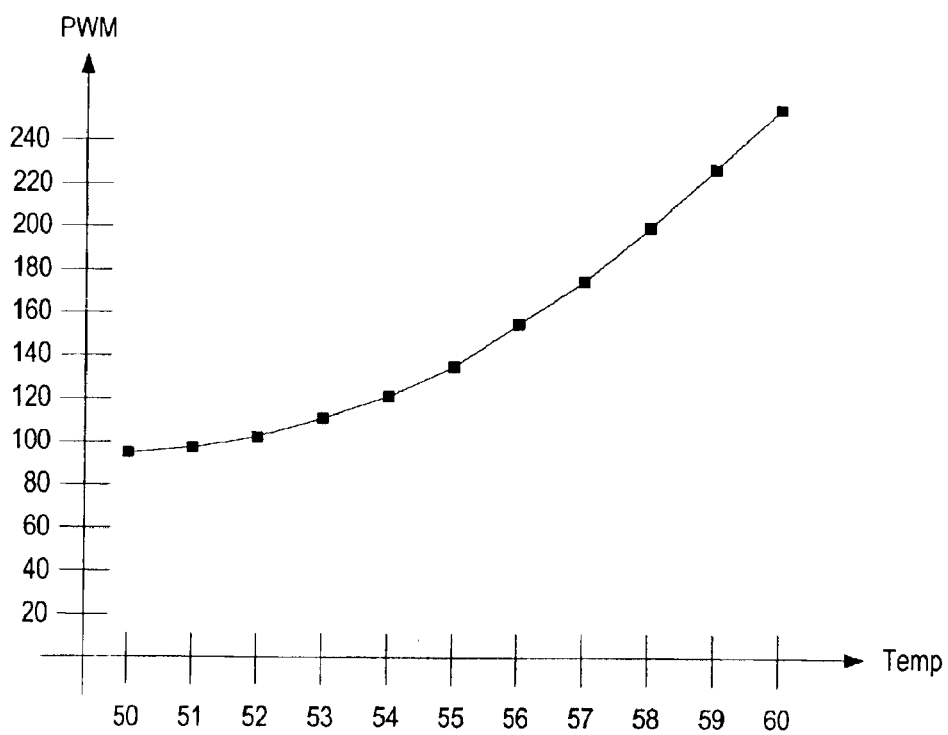
FIG. 4 shows another set of exemplary PWM duty cycle values and a plot of the relationship between the exemplary PWM duty cycle values and temperature, according to one embodiment.

FIGS. 3–4 show values and plots of duty cycle values calculated for different parameters. In FIG. 3, $PWM_{MIN}=1$, $PWM_{MAX}=255$, $T_{MIN}=50$ degrees Celsius, and $T_{MAX}=60$ degrees Celsius. The focal point, p, equals 0.095238 and the inverse focal point, P, equals 10.5. The first column of the table in FIG. 3 shows the uncompensated values for the PWM duty cycle calculated using the equation of a parabola at origin. These values are calculated proportional to the product of the temperature delta (relative to $T_{MIN}$) squared and the inverse focal point P. For example, if the current temperature equals 52, the temperature delta relative to $T_{MIN}$ will be 2. The product of $P*x^2=42$. In the example of FIG. 3, the PWM delta is generated equal to $(P*x^2)/4$, and thus the PWM delta will equal 10.5, which has been rounded to 11. This may represent a 4.3% duty cycle. Similarly, in this example, for a temperature delta of 9, the PWM delta equals $81*10.5/4=212.625$, which has been rounded to 213. This PWM value may represent an 83% duty cycle.

Once the uncompensated values of the PWM duty cycle have been calculated, the control logic 22 may apply any needed compensation in order to shift the result of the equation of the parabola at origin into the range of operable values of PWM. In this example, $PWM_{MIN}$ equals zero, and thus no additional compensation is needed. Therefore, the compensated values of PWM in the third column are equal to the uncompensated PWM values in the first column. A plot of the compensated PWM duty cycle values versus temperature is also shown in FIG. 3.

In FIG. 4, the range of operable duty cycle values are 96 to 255. The focal point value is 0.153846 and the inverse focal point value is 6.5. All other values are the same as in the example of FIG. 3. Here, uncompensated PWM duty cycle values are calculated using the equation of a parabola at the origin for the new inverse focal point value. Since $PWM_{MIN}$ does not equal zero, these uncompensated values are additionally modified by adding $PWM_{MIN}$ to each to obtain the values shown in the third column. A plot of the compensated PWM duty cycle values versus temperature is also shown in FIG. 4. Note that PWM duty cycle values may be calculated throughout the temperature range (e.g., at temperature deltas such as 1.5, 4.75, etc.) depending on the resolution of the device used to sense the temperature and the desired response of the fan controller. Note that other measures of temperature (e.g., degrees Fahrenheit) may also be used in some embodiments.

Returning to FIG. 1, note that at least a portion of the system shown in FIG. 1 may be implemented as an integrated circuit. For example, in one embodiment, the fan controller 10 may be implemented as an integrated circuit. Other system functionality (e.g., bus bridge or system controller functions) may also be included in such an integrated circuit in some embodiments.

Numerous variations and modifications will become apparent to those skilled in the art once the above disclosure is fully appreciated. It is intended that the following claims be interpreted to embrace all such variations and modifications.

What is claimed is:

1. A system, comprising:
   a pulse width modulation (PWM) generator configured to generate a PWM signal having a duty cycle, wherein the PWM generator is configured to generate the duty cycle of the PWM signal dependent on a duty cycle value; and
   control logic coupled to the PWM generator and configured to store an inverse focal point value, wherein the control logic is configured to generate the duty cycle value by processing the inverse focal point value and a temperature value indicating a current temperature according to an equation of a parabola.

2. The system of claim 1, wherein the control logic is configured to store a minimum temperature value, wherein the control logic is configured to generate the duty cycle value dependent on the minimum temperature value.

3. The system of claim 2, wherein the control logic is configured to update the minimum temperature value and the inverse focal point value.

4. The system of claim 1, wherein the control logic is configured to generate the duty cycle value by processing the temperature value according to the equation of a parabola at a coordinate origin and shifting a result of the equation into a range of operable duty cycle values.

5. The system of claim 1, wherein the control logic is configured to generate the duty cycle value by:

generating an uncompensated duty cycle value proportional to a square of a temperature delta value multiplied by the inverse focal point value, wherein the temperature delta value equals the temperature value minus a minimum temperature value; and generating the duty cycle value by adding a minimum duty cycle value to the uncompensated duty cycle value.

6. The system of claim 1, wherein the control logic is configured to selectively vary the duty cycle of the PWM signal less at higher temperature values if the temperature is stabilizing than if the temperature is increasing.

7. A method, comprising:

powering a fan according to a pulse width modulated (PWM) signal;

storing an inverse focal point value;

processing the inverse focal point value and a temperature value representing a current temperature according to an equation of a parabola to generate a duty cycle value; and generating a duty cycle of the PWM signal dependent on the duty cycle value.

8. The method of claim 7, further comprising storing a minimum temperature value, wherein said generating a duty cycle value comprises generating the duty cycle value dependent on the values of the minimum temperature value.

9. The method of claim 8, further comprising updating at least one of: the minimum temperature value and the inverse focal point value.

10. The method of claim 7, wherein said generating a duty cycle value comprises:

processing the temperature value according to the equation of a parabola at a coordinate origin;

generating the duty cycle value by shifting a result of said processing into a range of operable duty cycle values.

11. The method of claim 7, wherein said generating a duty cycle value comprises:

generating an uncompensated duty cycle value proportional to a square of a temperature delta value multiplied by the inverse focal point value, wherein the temperature delta value equals the temperature value minus a minimum temperature value; and generating the duty cycle value by adding a minimum duty cycle value to the uncompensated duty cycle value.

12. The method of claim 7, further comprising selectively varying the duty cycle of the PWM signal less at higher values of the temperature if the temperature is stabilizing than if the temperature is increasing.

13. A system, comprising:

means for powering a fan according to a pulse width modulated (PWM) signal having a duty cycle dependent on a duty cycle value;

means for generating the duty cycle value, wherein the means for generating store an inverse focal point value and process the inverse focal point value and a temperature value representing a current temperature according to an equation of a parabola to generate the duty cycle value.

* * * * *